United States Patent [19]

Brandt et al.

[11] 4,224,295
[45] * Sep. 23, 1980

[54] PROCESS FOR THE PRODUCTION OF FINELY DIVIDED SILICIC ACID BY SPRAY DRYING

[75] Inventors: Bernd Brandt, Wesseling-Berzdorf; Peter Nauroth, Wesseling; Albert Peters, Erftstadt-Liblar; Helmut Reinhardt, Rodenkirchen, all of Fed. Rep. of Germany

[73] Assignee: Deutsche Gold- und Silber-Scheideanstalt vormals Roessler, Frankfurt am Main, Fed. Rep. of Germany

[ * ] Notice: The portion of the term of this patent subsequent to Jun. 13, 1995, has been disclaimed.

[21] Appl. No.: 916,020

[22] Filed: Jun. 15, 1978

Related U.S. Application Data

[63] Continuation of Ser. No. 655,328, Feb. 5, 1976, abandoned.

[30] Foreign Application Priority Data

Feb. 7, 1975 [DE] Fed. Rep. of Germany ....... 2505191

[51] Int. Cl.$^2$ .................. C01B 33/12; C01B 33/18
[52] U.S. Cl. .................. 423/335; 423/339; 106/288 B
[58] Field of Search .................. 423/325, 335, 339; 106/288 B

[56] References Cited

U.S. PATENT DOCUMENTS

| | | | |
|---|---|---|---|
| 2,578,605 | 12/1951 | Sears et al. | 106/288 B X |
| 2,940,830 | 6/1960 | Thornhill | 423/339 |
| 3,281,210 | 10/1966 | Burke et al. | 106/288 B X |
| 3,383,172 | 5/1968 | Biegler et al. | 423/335 |
| 4,001,379 | 1/1977 | Turk et al. | 106/288 B X |
| 4,094,771 | 6/1978 | Brandt et al. | 423/335 X |

*Primary Examiner*—Jack Cooper
*Attorney, Agent, or Firm*—Beveridge, Degrandi, Kline & Lunsford

[57] ABSTRACT

A finely divided silicic acid having a pH>6 is prepared by spray drying, in the presence of a base or basic-reacting substance, a highly concentrated silicic acid suspension having excess, unwanted acidity.

33 Claims, No Drawings

PROCESS FOR THE PRODUCTION OF FINELY DIVIDED SILICIC ACID BY SPRAY DRYING

This is a continuation, of application Ser. No. 655,328 filed Feb. 5, 1976, now abandoned which is relied on and incorporated herein.

BRIEF SUMMARY OF THE INVENTION

The invention relates to a process for the production of a finely divided silicic acid by spray-drying of a sprayable highly concentrated silicic acid suspension having little grit, and adjustment of the dried silicic acid product to a pH value of $>6.0$.

Precipitated silicic acid, which is produced in a manner known per se, by a wet chemical method, must be dried in order to fulfill its purpose in normal use. This can be accomplished by feeding a filter cake to a spray dryer or other drying means.

One customarily employs a washed and then dispersed silicic acid filter cake for spray drying. The filter cake can be prepared by a precipitation process by mixing an aqueous alkali silicate solution with an acid at elevated temperature (80° C.). The redispersed dough of a filter cake can, in addition, be homogenized in a grinding apparatus. Thereafter, the precipitation suspension adjusted with acid (pH 4 to 5.5) is fed through a nozzle or a fan blower at suitable spraying pressure, and is sprayed into drying gases, whereby an inlet temperature in the area of about 350° to 500° C. and an outlet temperature between 100° to 130° C. is maintained.

Depending upon the solids content and the structure of the silicic acid filter cake, the nozzle or the blower element can become clogged. Therefore, it is necessary to structure the silicic acid filter cake in such a way, that no clogging of the nozzle or of the blower element will occur. This can be achieved to a certain extent by homogenizing the dough of the filter cake.

It has also been known to dilute the filter cake with water in order to adapt the structure of the silicic acid filter cake to the requirements of the spray dryer. When the filter cake is diluted with water, however, a great deal of power must be used during drying in order to remove the added volume of water from the silicic acid filter cake. This method of processing of the silicic acid filter cake yields a filter dough having inhomogeneous structure. That is, the filter dough contains grit, i.e., it has particles of a size of over 45 μm.

According to another proposal, the silicic acid filter cake is structured in such a way, that it will require a slight evaporation energy during spray-drying and yet contain a homogeneous silicic acid free of grit.

This is accomplished by a process for the production of a sprayable, highly concentrated aqueous suspension of precipitated silicic acid having little grit and at least about 12% by weight, preferably at least 18% by weight, solids. The process comprises continuously feeding a silicic acid filter cake and a suspension agent by way of feeding elements into a dissolver container provided with a stirring element. The suspension agent is typically a dilute, aqueous acid, preferably a 20-30 weight percent $H_2SO_4$ solution. The ratio of the container diameter to the diameter of the stirring element amounts to about 3:1. The ratio of the dissolver container diameter to the level of filling amounts to a maximum of about 1:2. The dissolver container contains at least about 1.5 to about 2 kg of silicic acid suspension; for each 1 kg of silicic acid filter cake added to the container, a sufficient amount of suspension is removed in order to maintain said at least 1.5 to about 2 kg of silicic acid suspension in the container. The silicic acid filter cake and suspension agent are mixed while maintaining a pH value of a maximum of about 4. The stirring element has a peripheral speed of about 20-30 m/sec. A portion of the resulting silicic acid suspension is drawn off from the zone of highest turbulence by way of a separating organ or a mixer. A wire basket is used as a separating element or else the suspension can be drawn off by way of a series connected forcible mixer or a mixing pump, whereby a part of the silicic acid suspension which had run through the wire basket or through the mixer, is conducted back into the dissolver. As a result of from this recycling shearing action of the silicic acid present in the filter cake, there results the desired freedom of little knots and grit. Such a process is disclosed in commonly assigned U.S. Patent Application Ser. No. 648,848, filed Jan. 13, 1976, by Bernd Brandt, Peter Nauroth, Albert Peters and Helmut Reinhardt. The entire disclosure of this application is relied upon and incorporated herein by reference.

As a result of that, one will achieve such a restructuring of the silicic acid filter cake, that the silicic acid suspension resulting from it will be homogeneous and free of grit and can be subjected to spray-drying without unusually large amounts of energy or labor.

The silicic acid product produced by the process described above and disclosed in copending application Ser. No. 648,848 filed Jan. 13, 1976 is one having little grit and contains not more than about 0.2 weight percent of particles having a size greater than about 45 μm.

When an acid is added during the precipitation process or in the production of the silicic acid suspension, the product after drying shows on the silicic acid surface an acidity not desirable for certain applications. Among these areas of application are, for example, the processing of oil-containing industrial sewage, silicic acids as fillers in rubbers and polymers, as fillers for printing inks, as "free flow" agents when added to feed, and as matting agents, as well as additives to defoaming agents.

Accordingly, there exists a need in the art for means for neutralizing the surface acidity of silicic acid to an alkaline or neutral pH value.

This invention provides a process for the production of a finely divided silicic acid having a pH value of $>6.0$. The process comprises spray drying a sprayable, highly concentrated silicic acid suspension having little grit and adjusting the dried product to a pH value of $>6.0$. A silicic acid is obtained which is particularly favorable for the above-mentioned areas of application. The essence of the invention is to be seen in the fact that for a complete or partial neutralization of the acid used as suspension agent or acid still present in a redispersed filter cake, the spray drying is accomplished in the presence of a base or of a basic-reacting substance in an amount at least sufficient to yield the product having a pH value of $>6.0$.

DETAILED DESCRIPTION

To carry out the process of this invention, the liquid silicic acid suspension can be reacted directly prior to entry into the spray dryer with a base or a substance reacting like a base, for example, an aqueous solution of NaOH.

In a preferred embodiment, the base is inserted in the form of a vapor or a fine mist continuously into the spray dryer; the base is thereby intimately mixed with the silicic acid during the drying process.

In a further variation of the invention, the desired goal can be achieved by neutralization of the already dried silicic acid during the discharge from the spray dryer or during the continued conveyance thereafter. Thus, it turned out, that the addition of gaseous ammonia to the mixture of dried silicic acid and conveying air could be very well carried out technically, and yielded the desired product.

The base or basic reacting substance and the suspension can be added simultaneously, either separately or together, into a spray dryer.

Preferred bases and basic-reacting substances are the hydroxides, carbonates or bicarbonates of alkali metals or alkaline earth metals; ammonia; and compounds capable of liberating ammonia.

Further, the amount of base or basic-reacting substance can be in excess of the amount required to yield the dried, finely divided silicic acid product having a pH of $>6$.

As used herein, the expression "having little grit" means that the silicic acid contains not more than about 0.2 weight percent of particles having a size greater than about 45 $\mu$m.

In this manner, silicic acids with pH values of $>6$ can be produced. In the following examples, the invention will be explained in more detail. All parts, proportions, and percentages are by weight unless otherwise indicated.

EXAMPLE 1

Per 100 l of liquefied silicic acid suspension, which contain about 20 kg of solid substance and about 40 g of free sulfuric acid, 2.3 l of lime water with a content of 10 g CaO/l are admixed evenly and continuously by means of a dosing plunger pump immediately prior to introduction of the suspension into an atomizing wheel of a spray dryer. At the same time, the essentially high turbulence prevailing in the atomizing wheel is used for the intermixing of the silicic acid suspension with the lime water.

Whenever the addition of the base takes place in the last part of the conveying line—say 10–200 cm prior to its entering into the atomizing wheel, then tarry times of a few hundredths of a second of the base in the liquid suspension are computed. These tarry times are completely sufficient for the neutralization of the acid. On the other hand, the silicic acid structure cannot be influenced disadvantageously by the base in such short periods of time.

The dry silicic acid obtained contains about 0.3% $CaSO_4$ and has a pH value of 7.0 measured in a 5% aqueous suspension.

EXAMPLE 2

Into the turbulent "cloud" which is formed in a spray dryer from fine droplets of a silicic acid suspension and hot drying gas, a caustic soda solution diluted by means of a 1 or 2 substance nozzle provided with a "lance" is sprayed in as much as possible centrally.

The caustic soda solution is quickly and uniformly absorbed by the liquid droplets.

In the case of spraying in of 5 l of caustic soda solution, 10% NaOH per 100 kg of acidly processed silicic acid, a product with a pH of 8.7 is obtained.

EXAMPLE 3

After spray-drying of the silicic acid, the product is conveyed pneumatically to supply silos. The above-described neutralization can be carried out in this path. It will be sufficient for that to admix a quantity of 0.9 N l of ammonia gas=0.7 g $NH_3$ to the conveying stream of air per $Nm^3$ (i.e., $m^3$ at standard temperature and pressure). In the conveying air stream, about 1 kg of silicic acid is conveyed per $Nm^3$ air. If one assumes that this silicic acid has a content of 0.2% of free sulfuric acid, then after the neutralization a pH value of 6.5–7.0 results in the final product.

What is claimed is:

1. A process for preparing a finely divided silicic acid having little grit, comprising:
   (a) preparing a sprayable aqueous suspension of a precipitated silicic acid containing at least about 12% by weight solids by:
      (1) continuously feeding a silicic acid filter cake and a suspension agent into a dissolver container provided with stirring means;
      (2) stirring said filter cake and suspension agent while maintaining a maximum pH value of about 4 in the suspension, said stirring means having a peripheral speed of about 20–30 m/sec; and
      (3) continuously removing a portion of the resulting suspension from a zone of highest turbulence of the suspension in said container; wherein said container and said stirring means each have a diameter and the ratio of container diameter to the diameter of the stirring means is about 3:1 and the ratio of container diameter to level of filling of said container is maintained at a maximum of about 1:2; and further wherein the silicic acid suspension in said container is maintained in an amount of at least 1.5 to about 2 kg for each 1 kg of silicic acid filter cake which is added to the container; and thereafter
   (b) spray drying said resulting suspension in the presence of a base or basic-reacting substance selected from the group consisting of alkali metal hydroxides, alkaline earth metal hydroxides, alkali metal carbonates or bicarbonates, alkaline earth metal carbonates or bicarbonates, ammonia or a compound capable of liberating ammonia in an amount at least sufficient to yield a dried, finely divided silicic acid having a pH value of $>6$ in a 5% by weight aqueous suspension.

2. Process according to claim 1 wherein said suspension agent is a dilute, aqueous acid.

3. Process according to claim 2 wherein said dilute, aqueous acid is an aqueous solution containing 20–30 weight percent $H_2SO_4$.

4. Process according to claim 1 whereby part of said portion of said resulting suspension removed from said zone of highest turbulence is returned to said dissolver to provide a shearing action on said filter cake.

5. Process according to claim 1 wherein the amount of base or basic-reacting substance is in excess of the amount required to yield said dried silicic acid.

6. Process according to claim 1 wherein said suspension contains an acid as suspension agent, and said acid is completely or partially neutralized with said base or basic-reacting substance.

7. Process according to claim 6 wherein said base is an alkali metal hydroxide or alkaline earth metal hydroxide.

8. Process according to claim 6 wherein said basic-reacting substance is an alkali metal carbonate or bicarbonate or an alkaline earth metal carbonate or bicarbonate.

9. Process according to claim 6 wherein said basic-reacting substance is ammonia or a compound capable of liberating ammonia.

10. Process according to claim 6 wherein the amount of base or basic-reacting substance is in excess of the amount required to yield said dried silicic acid.

11. Process according to claim 1 comprising adding said base or basic-reacting substance and said suspension in liquefied form simultaneously to a spray dryer.

12. Process according to claim 11 wherein said base is an alkali metal hydroxide or alkaline earth metal hydroxide.

13. Process according to claim 11 wherein said basic-reacting substance is an alkali metal carbonate or bicarbonate or an alkaline earth metal carbonate or bicarbonate.

14. Process according to claim 11 wherein said basic-reacting substance is ammonia or a compound capable of liberating ammonia.

15. Process according to claim 11 wherein the amount of base or basic-reacting substance is in excess of the amount required to yield said dried silicic acid.

16. Process according to claim 11 in which said base is an aqueous solution of sodium hydroxide.

17. Process according to claim 1 comprising adding said base or basic-reacting substance and said suspension in liquefied form separately but simultaneously to a spray dryer.

18. Process according to claim 17 in which said base is an aqueous solution of sodium hydroxide.

19. Process according to claim 1 comprising adding said suspension to a spray dryer and then adding said base or basic-reacting substances during spray drying of said suspension.

20. Process according to claim 19 wherein said base is an alkali metal hydroxide or alkaline earth metal hydroxide.

21. Process according to claim 19 wherein said basic-reacting substance is an alkali metal carbonate or bicarbonate or an alkaline earth metal carbonate or bicarbonate.

22. Process according to claim 19 wherein the amount of base or basic-reacting substance is in excess of the amount required to yield said dried silicic acid.

23. Process according to claim 19 in which said base is an aqueous solution of sodium hydroxide.

24. Process according to claim 1 comprising reacting said base or basic-reacting substance with said suspension in liquified form, and then spray drying the resulting mixture.

25. Process according to claim 24 in which said base is an aqueous solution of NaOH.

26. Process according to claim 1 in which said base is an aqueous solution of NaOH.

27. Process according to claim 1 wherein said silicic acid suspension contains at least about 18% by weight solids.

28. A process for preparing a finely divided silicic acid having little grit, said process comprising adding an acidic silicic acid suspension containing at least about 12% by weight solids to a spray dryer, spray drying said suspension, and then contacting the resulting dried silicic acid in a conveying air stream therefor with a base or basic-reacting substance selected from the group consisting of alkali metal hydroxides, alkaline earth metal hydroxides, alkali metal carbonates or bicarbonates, alkaline earth metal carbonates or bicarbonates, ammonia or a compound capable of liberating ammonia in an amount at least sufficient to yield a dried, finely divided silicic acid having a pH value of >6 in a 5% by weight aqueous suspension, said silicic acid suspension having been prepared by (a) preparing a sprayable aqueous suspension of a precipitated silicic acid containing at least about 12% by weight solids by:
(1) continuously feeding a silicic acid filter cake and a suspension agent into a dissolver container provided with stirring means;
(2) stirring said filter cake and suspension agent while maintaining a maximum pH value of about 4 in the suspension, said stirring means having a peripheral speed of about 20–30 m/sec; and
(3) continuously removing a portion of the resulting suspension from a zone of highest turbulence of the suspension in said container;

wherein said container and said stirring means each have a diameter and the ratio of container diameter to the diameter of the stirring means is about 3:1 and the ratio of container diameter to level of filling of said container is maintained at a maximum of about 1:2; and further wherein the silicic acid suspension in said container is maintained in an amount of at least 1.5 to about 2 kg for each 1 kg of silicic acid filter cake which is added to the container.

29. Process according to claim 28 in which said base is an aqueous solution of sodium hydroxide.

30. Process according to claim 28 wherein said basic-reacting substance is an alkali metal carbonate or bicarbonate or an alkaline earth metal carbonate or bicarbonate.

31. Process according to claim 28 wherein said basic-reacting substance is ammonia or a compound capable of liberating ammona.

32. Process according to claim 28 wherein the amount of base or basic-reacting substance is in excess of the amount required to yield said dried silicic acid.

33. Process according to claim 28 wherein said base is an alkali metal hydroxide or alkaline earth metal hydroxide.

* * * * *